Dec. 24, 1929.  R. A. WORNSTAFF  1,741,004
UTILITY SHOVEL
Filed Dec. 3, 1928  2 Sheets-Sheet 1

R. A. Wornstaff, Inventor

By Linton, Kellogg & Smith
Attorneys

Dec. 24, 1929.  R. A. WORNSTAFF  1,741,004
UTILITY SHOVEL
Filed Dec. 3, 1928  2 Sheets-Sheet 2
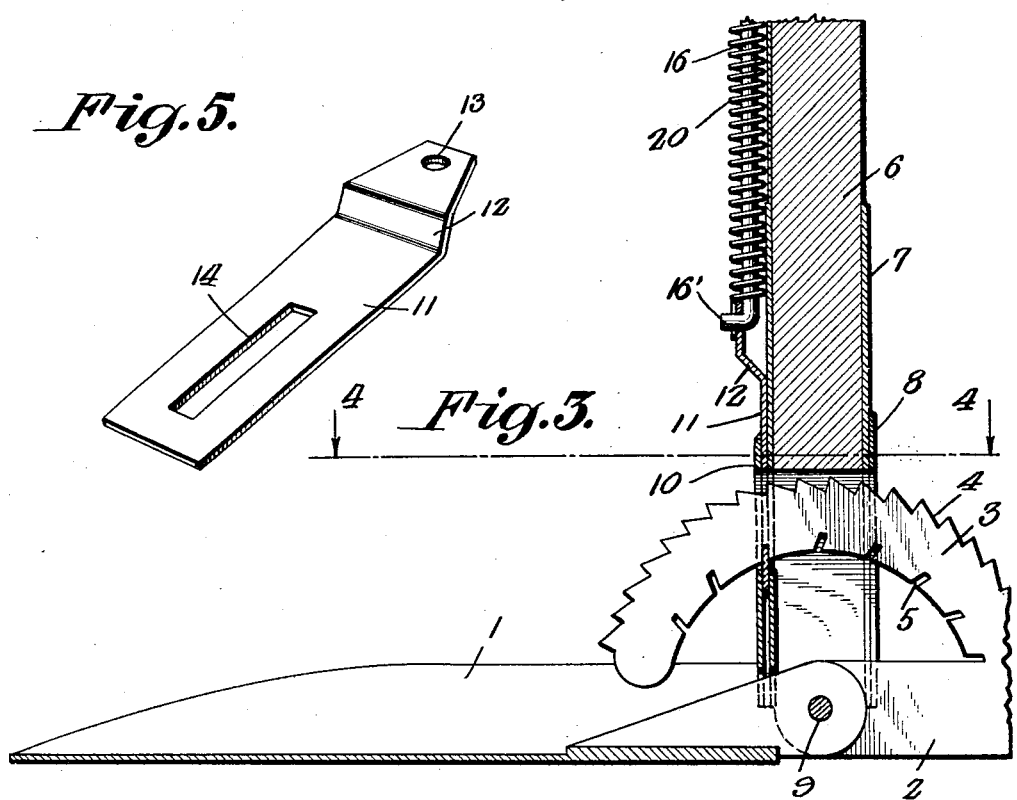
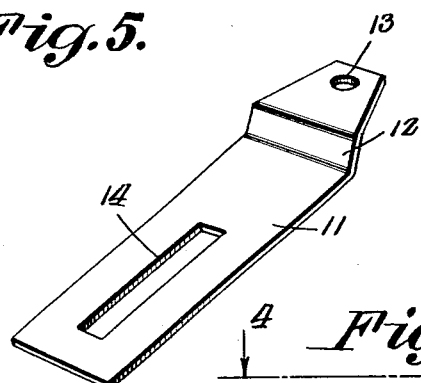
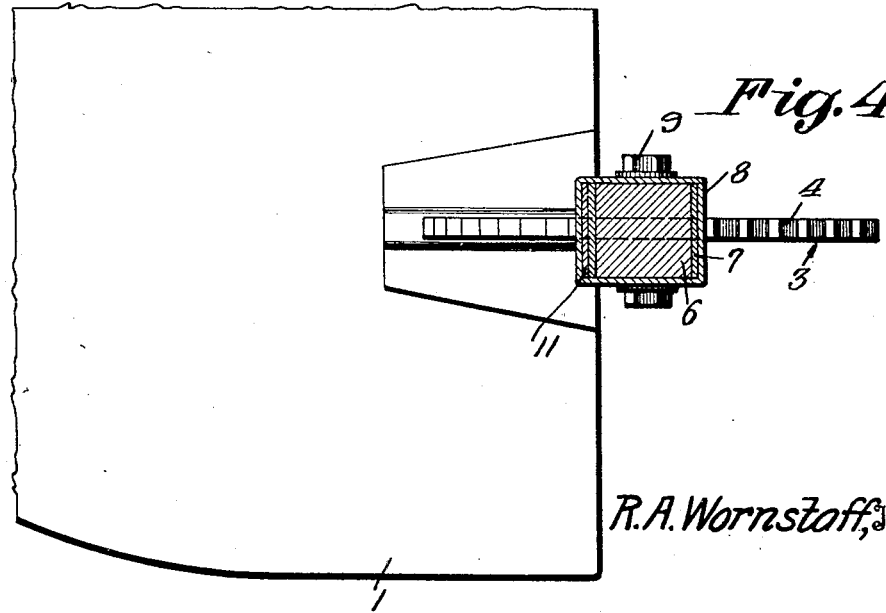
R. A. Wornstaff, Inventor
By Linton, Kellogg & Smith
Attorneys Patented Dec. 24, 1929

1,741,004

UNITED STATES PATENT OFFICE

RICHARD A. WORNSTAFF, OF BRIGHTON, IOWA

UTILITY SHOVEL

Application filed December 3, 1928. Serial No. 323,432.

This invention relates to improvements in shovels, having for an object to provide a shovel of such construction as will permit of various adjustments of the shovel blade or body with respect to the handle therefor, hence, allowing the advantages of a spoon shovel and an ordinary straight shovel to be embodied in a single device and rendering the same especially useful in pole or post hole digging or in similar operations where it has heretofore been necessary to utilize a spading or digging shovel to loosen the earth and then, a spoon type of shovel to remove the loosened earth from the operation.

It is also an equally important object of the invention to provide a shovel of the character mentioned employing a novel form of mounting for the shovel blade with respect to the handle therefor, including a means for allowing of free angular adjustment or pivotal movement of the blade in one direction with relation to the handle, whereby said blade may be moved to the desired position during a digging operation for a subsequent lifting or spooning operation and also, that said blade may be rigidly secured in a particular angularly adjusted position with relation to its handle, that the same may be used as an ordinary straight shovel.

Yet another and equally important object of the invention is to provide the adjustable mounting of the shovel blade or body with a common means for effecting locking of the said blade in either of its several adjustments, that is, whereby said shovel blade will have free pivotal movement in one direction with relation to the blade in one instance and in another instance, will be rigidly or fixedly locked in an angularly adjusted position with respect to the handle of the device; the said means being readily and conveniently operable from the hand engaged portion of the shovel handle.

Other objects of the invention will be in part obvious and in part pointed out hereinafter.

In order that the invention and its mode of operation may be readily understood by those skilled in the art to which it appertains, I have in the accompanying illustrative drawings and in the detailed description based thereupon, set out one possible embodiment of the invention.

In these drawings:

Figure 3 is an enlarged fragmentary detail in longitudinal section through a portion of the shovel blade or body and the handle therefor, showing the construction of the shovel blade mounting and its arrangement with respect to the shovel handle as well as the locking means for the blade;

Figure 4 is a transverse section taken on the line 4—4 of Figure 3 looking in the direction in which the arrows point, and Figure 5 is an enlarged detail in perspective of the locking means employed.

Figure 2:
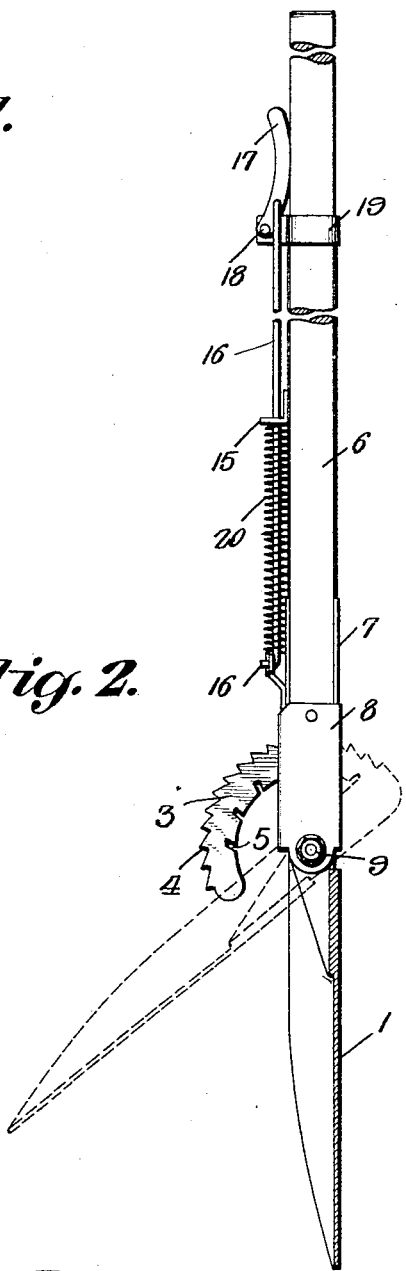
Figure 2 is a longitudinal section taken on the line 2—2 of Figure 1 looking in the direction in which the arrows point.

Having more particular reference to the drawings, in connection with which like characters of reference will designate corresponding parts throughout, the invention may be stated to comprise a body element, such for instance as a shovel blade indicated herein by the numeral 1, said blade having the rearward and intermediate portions thereof provided with a fixedly arranged and longitudinally disposed shank or arm 2 having a pivot bolt receiving opening formed in the same while upon the outer or free end thereof, a reversely disposed and longitudinally positioned segment 3 is arranged. This segment 3, as will be noted upon reference to the Figures 2 and 3, is formed upon its inner and outer peripheral portions with notches or teeth 4 and 5, the notches 4 being such as to constitute a ratchet surface, as is clearly shown in the Figure 3, whereas the notches or recesses 5 are of substantially U-shaped formation and are disposed in a forward direction, as is again well shown in the Figure 3.

A handle 6, of suitable length, is provided the shovel and this handle receives over its normally lower extremity protective sheathing of metal or similar material as is indicated by the numeral 7; a metal sleeve 8 being fixedly engaged over said normally lower end of the handle and sheathing as indicated by the numeral 8 and having the free portion thereof formed with a bifurcated bearing adapted to receive between the opposite portions thereof, the pivot bolt opening carrying portion of the shank or arm 2, aforesaid. A pivot bolt or similar device as indicated by the numeral 9 is adapted to be passed through corresponding openings formed in the free extremities of the bifurcated bearing portion of the metal sleeve 8 and through the bolt receiving opening in said shank 2, hence, effecting a pivotal connection or mounting of the shovel blade or body 1 with respect to the handle 6. Also, a metal cap or guard is adapted to be engaged over one side of the metal sleeve 8, as is shown in the Figures 1 and 3, this guard being indicated for convenience by the numeral 10 and having its normally front or forward wall arranged in spaced relation with respect to the adjacent wall or portion of the sleeve 8, hence, providing as between these two adjacent portions, a longitudinally disposed way.

Slidably received in the longitudinal way provided between the cap 10 and the adjacent portion of the sleeve 8 is a substantially flat and rectangularly shaped locking element indicated herein by the numeral 11, said element being of a width approximately corresponding to the width of the elements 8 and 10 and being snugly and slidably arranged with respect thereto for longitudinally adjustable movement; the normally upper end of such element being formed with an offset portion 12 apertured as at 13 whereby to permit of connection with operating means, hereinafter more fully described. The body of this locking element 11 is formed with an intermediately arranged rectangularly shaped opening 14, this opening being adapted to coincide with a somewhat similar opening formed in the normally forward or front wall of the cap 10 and the adjacent portion of the sleeve 8, hence permitting of the slidable passage of the segment 3 therethrough and consequently upon this, pivotal movement of the handle 6 with respect to the shovel blade 1 or vice versa. In this connection, it is to be noted that the width of the opening 14 in the locking element 11 is such as to snugly receive the segment 3 therethrough, while the length of said opening is sufficient to permit of limited longitudinal movement of such locking element with respect to said segment 3.

With a view toward providing operating means for the locking element 11, I fixedly mount upon an intermediate portion of the handle 6, an angle bracket 15, said bracket having an opening formed therein through which a connecting rod 16 is longitudinally passed, this rod being arranged longitudinally of and in substantial parallelism to the handle 6 and furthermore, being of a length such as to permit its extension into engagement with the apertured portion 12 of said locking element 11, in the manner as is clearly shown in the Figure 3, this engagement being effected by the bending of a finger 16' from said connecting rod 16 and engaging it through the opening 13 in said portion 12 of the locking element. The opposite or normally upper end of this connecting rod 16 is extended into pivotal engagement with a hand lever 17 pivoted, as at 18 to a lug provided upon a clamping band or strap 19 secured to the upper or normally upper end portion of the handle 6; this hand lever 17 being capable of pivotal movement with respect to the handle 6 from that position as is shown in the Figures 1 and 2 to a position as substantially right angles thereto.

A compression coiled spring 20 is engaged about the normally lower portion of the connecting rod 6, having one end thereof bearing upon the adjacent side of the angle bracket 15 and its opposite end bearing upon an adjacent portion of the offset part 12 of the locking element 11 or the finger 16' of said connecting rod 16. Thus, it will be understood that said compression spring 20 will afford a spring urge for tending to move the longitudinally disposed connecting rod 16 in a direction towards the shovel blade 1, that is, with outward and downward pivotal movement of the hand lever 17.

In usage of my improved device, when it is desired to use the same as a digging shovel, the hand lever 17 is swung outwardly and downwardly to a position at substantially right angles with respect to the handle 6, thereby causing the slidable locking element 11 to be moved to the limits of its normally downward position whereupon the normally upper end portion of the opening 14 in said locking element will be brought into yieldable engagement with the ratchet face provided upon the upper side of the segment 3 through the medium of the series of notches 4. When in this position, it will be understood that said locking element 11 will serve to permit of free pivotal movement of the shovel blade 1 with respect to the handle 6 in one direction, thereby allowing said shovel blade to be brought to an angularly adjusted position with respect to said handle 6 after the fashion as is shown in the Figures 2 and 3. Pivotal movement as between the shovel blade 1 and the handle 6 in an opposite direction, however, will be positively prevented by reason of this yieldable engagement of the locking element 11 with the notches 4 of the segment 3. Thus, it will be seen that when the shovel blade 1 is in its normally "straight" position, as is illustrated in the Figures 1 and 2, the device may be used as a spading or digging element to particular advantage in the digging of pole or post holes. Also, by reason of the fact that pivotal movement of the shovel blade 1 with respect to the handle 6 will be permitted in one direction, as heretofore explained, it will be furthermore seen and appreciated by workers skilled in this art, that as the shovel blade 1 is forced into the earth from pressure directed thereonto from the handle 6, said blade by proper movement of the handle 6 may be caused to assume a position at angles with respect to the handle 6, as is shown in the Figures 2 and 3. Consequently upon this, when the shovel has reached the limit of the desired digging engagement of the same with the earth, it will have been moved to an angular position and will then effectually serve as the well known type of spoon shovel, whereby a maximum load of earth will rest upon said shovel blade and consequently (by reason of its angular positioning with respect to the blade 6), may be removed from the operation. In this connection, it will be understood that pivotal movement of the shovel blade 1 in a direction whereby the same would assume or partially assume its initial position as is shown in full lines in the Figure 1, will be prevented by reason of the engagement of the locking element 11 with the ratchet face or notches 4 of the segment 3. However, when it is desired to return the shovel blade 1 to its normal or initial position, this may be readily effected by swinging the hand lever 17 to a position whereat the locking element 11 will be in a neutral position with respect to the notched inner and outer peripheral surfaces of the segment 3.

Figure 1:
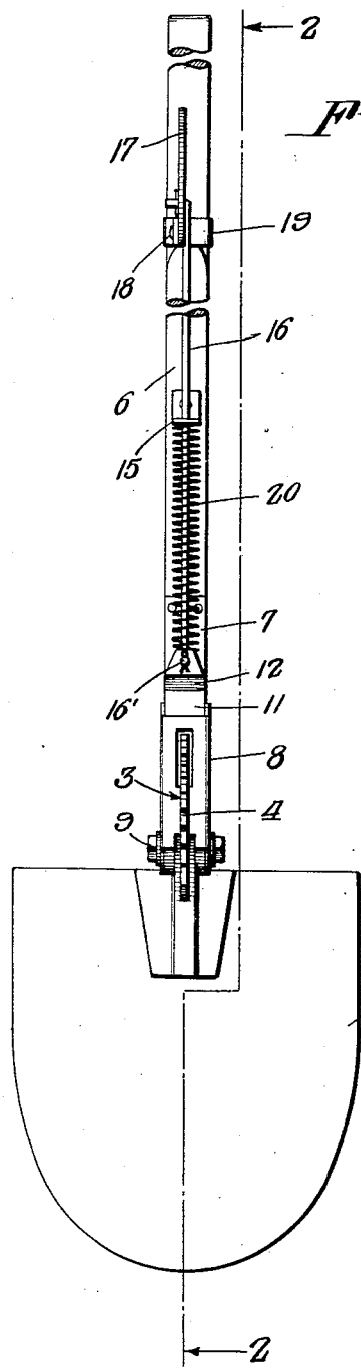
Figure 1 is a front elevation of my improved shovel.

When it is desired to use the device as a straight shovel, the shovel blade 1 may be then rigidly adjusted or secured with respect to the handle 6 merely by swinging the hand lever 17 to that position as is shown in the Figures 1 and 2, whereupon the opposite or normally lower end of the rectangular opening 14 in the locking element 11 will be brought into engagement with the particularly adjacent notch 5 in the inner peripheral surface of the segment 3, hence, locking said segment and said shovel blade with respect to the handle 6 and positively preventing pivotal movement therebetween.

From the foregoing, it will be understood that I have provided in a single device, a combined straight and spoon shovel, and furthermore, a device that may be advantageously used in various characters of earth working, such for example, as in pole or post hole digging or in similar operations where it is desirable that a compound adjustment will be provided for the shovel blade, that it may be caused to move from a parallel or substantially parallel position with respect to the handle 6 to an angular position with respect thereto.

Manifestly, the construction shown is capable of considerable modification, and such modification as is within the scope of my claims I consider within the spirit of my invention.

I claim:—

1. In a device of the character described, a handle, a body pivotally mounted upon said handle, segmental means fixedly carried by said body, and a locking means movably mounted upon the handle selectively engageable with different portions of said segmental means in a manner to permit of pivotal movement of the body in one direction with respect to said handle when engaged with one portion of the segmental means and to rigidly fix said body with respect to said handle when engaged with the remaining portion of said segmental means.

2. In a device of the character described, a handle, a body pivotally mounted upon said handle, a shank extended longitudinally from the body, a segment fixedly carried upon said shank, the inner and outer peripheral surfaces of said segment having series of notches formed therein, and a locking means carried upon said handle and movable into engagement, selectively, with the notched inner and outer peripheral surfaces of said segment.

3. In a device of the character described, a handle, a sleeve having a bifurcated bearing portion fixedly secured to said handle, a body having a longitudinally disposed shank fixed upon one portion thereof pivoted in the bifurcated bearing portion, the free portion of said shank having a fixedly arranged segment thereupon and arranged parallel to the same, one side of said segment being formed with a ratchet face and the opposite side of said segment being formed with a series of pockets, and a locking means slidably mounted upon said handle adapted to be selectively engaged with either the ratchet face or the pockets upon said segment.

4. In a device of the character described, a handle, a sleeve having a bifurcated bearing portion secured upon one end of said handle, a body carrying a longitudinally disposed shank, said shank being pivotally mounted in the bifurcated bearing portion, a segment fixedly carried upon said shank and arranged parallel thereto, one peripheral portion of said segment being formed with a series of ratchet teeth and the opposite peripheral portion of said segment being formed with a series of relatively spaced pockets, a locking plate slidably mounted upon said handle adjacent the bifurcated bearing device having an opening formed therein for slidably receiving said segment therethrough and said plate being adapted to be selectively moved into operative engagement with either the ratchet teeth or the pockets upon the several peripheral surfaces of said segment.

5. In a device of the character described, a handle, a bifurcated bearing sleeve carried upon said handle, a body carrying a fixed longitudinal shank, a segment fixedly mounted upon said shank and parallel to the same, one peripheral surface of said segment being formed with a series of ratchet teeth and the opposite peripheral surface of said segment being formed with a series of relatively spaced pockets, a cap portion engaged over a part of said bifurcated bearing sleeve having an opening formed therein for receiving the segment therethrough, and a locking plate slidably mounted between said cap and an adjacent portion of said bifurcated bearing sleeve having an opening formed therein for receiving said segment therethrough, said locking plate being adapted to be selectively moved into operative engagement with either the ratchet teeth upon one peripheral surface of said segment or with the pockets upon the opposite peripheral surface of said segment.

In witness whereof I have hereunto set my hand.

RICHARD A. WORNSTAFF.